United States Patent [19] [11] 4,388,865
Kellner [45] Jun. 21, 1983

[54] PRINTING LAYER OF URETHANE AND ACETYL POLYMERS AND METHOD OF MAKING

[75] Inventor: Phillip R. Kellner, London, England
[73] Assignee: Crosfield Electronics Limited, London, England

[21] Appl. No.: 242,099
[22] Filed: Mar. 10, 1981
[30] Foreign Application Priority Data
Mar. 11, 1980 [GB] United Kingdom ................. 8008194
[51] Int. Cl.³ ......................... B41C 1/02; B29C 17/08
[52] U.S. Cl. ................................ 101/401.1; 101/150; 346/76 L; 428/423.1; 264/25
[58] Field of Search ............ 101/150, 170, 467, 401.1, 101/128.4, 426; 428/423.1, 425.8, 423.3, 423.5, 423.7, 424.2, 424.6, 425.3, 437; 346/76 L; 430/300, 307; 264/25

[56] References Cited

U.S. PATENT DOCUMENTS 3,104,236 9/1963 Lavin et al. .................. 428/425.8 X
3,481,756 12/1969 Kong .............................. 428/437 X
3,549,733 12/1970 Caddell ................................ 264/25
3,649,439 3/1972 Ross ................................ 428/423.7
3,696,742 10/1972 Parts et al. ...................... 101/128.4
3,867,150 2/1975 Ketley ............................ 430/307 X
4,069,487 1/1978 Kasai et al. ....................... 346/76 L
4,093,684 6/1978 Parts et al. ........................ 346/76 L

FOREIGN PATENT DOCUMENTS 50-45886 4/1975 Japan ............................... 428/423.1

OTHER PUBLICATIONS

Jordan "Laser Engraving of Gravure Cylinders", Crosfield Electronics, Pacuage Printing & Die cutting, Mar. 1978, pp. 32-34.

*Primary Examiner*—E. H. Eickholt
*Attorney, Agent, or Firm*—Sughrue, Mion, Zinn, Macpeak and Seas

[57] ABSTRACT

A printing member has a print surface formed of a blend of urethane and acetal polymers and is particularly suitable when it is to be engraved by laser engraving to form an intaglio print surface.

21 Claims, No Drawings

PRINTING LAYER OF URETHANE AND ACETYL POLYMERS AND METHOD OF MAKING

Printing members for intaglio printing, particularly gravure printing, must be made of a material having various critical properties. It must be readily engraved with an image to be printed. It must have a high wear-resistance to combat wear by the doctor blade and printing substrates. It must have high solvent resistance so that it is not chemically affected by the ink, or ink solvents. It must be dimensionally very stable because of high pressures generated during the printing process. Finally it must be relatively cheap as the printing member is often discarded at the end of a particular print run. To meet these apparently mutually incompatible requirements printing members have conventionally comprised a steel substrate with a printing surface formed of a continuous plated copper coating and the image pattern is engraved into this plated copper coating.

Alternatives to copper as the printing surface have been proposed. It has been proposed in British patent specification No. 1,544,748 to form the printing surface of a polymer having a particular tensile strength, to form ink cells in the surface by mechanical engraving means and to use a gravure printing doctor blade formed of a polymer having a particular Izod impact strength. Polymers named for use as the print surface include polyethylene; polyvinyl chloride, polyamides, polyesters, and polycarbonates. It is said that the polymer can be coated onto a printing cylinder by extrusion moulding, spray coating, brush coating, powder coating or blade coating.

Normal intaglio print surfaces are formed of a continuous sheet of material which is engraved. Various methods of conducting the engraving are known. Attempts have been made to engrave a continuous metal print surface by use of a laser, for instance a pulsed laser beam, each pulse of energy being used to form a gravure cell the size or depth of which depended on the energy of the pulse. As explained in British patent specification No. 1,299,243 this method tended to result in the deposition of a rim of metal around each cell, thus impairing the printing properties of the printing surface. In an attempt at overcoming these difficulties it was described in that specification and subsequently to form the printing surface of two materials, one material defining cells of the required cell pattern and the other material filling the cells and being more easily decomposed or evaporated than the first material. The laser beam was then used to evaporate or decompose the second material to leave cells defined by the first material. Various materials have been proposed for use as the second material. As explained in specification No. 1,299,243 the second material could be softer than the first material that had to be hard to give wear resistance. Examples quoted as second material are polythene, glass and antimony. In specification Nos. 1,465,364 and 1,498,811 the use of epoxy resins as the second material is proposed.

These methods all suffer from various disadvantages, including the fact that they involve the initial formation of cells of the first material.

It would therefore be desirable to be able to engrave a printing surface of a continuous sheet using a laser beam and to avoid these disadvantages. However the difficulty still remains of formulating the printing surface of a material that can be engraved by a laser beam to give a clean engraving and which will serve as a good printing surface. As mentioned the conventional metals are unsatisfactory and we have found that most polymeric materials also tend to suffer from the same disadvantages as metals, namely that they result in the formation of a rim of polymer in the zone around the area being struck by the beam.

In applications that were unpublished until after the priority date of this application (British No. 7,931,053, German No. P2937275.6, Japanese No. 117441/79 and U.S. No. 75,390) there is described an intaglio printing member comprising a print surface formed of a continuous sheet of rigid polymeric composition that, when struck by an ion, electron or laser beam in an area, is converted to volatile products and volatilises throughout the entire area while remaining as a rigid solid in the zone adjacent the area where it volatilises. The preferred polymeric composition is a polyacetal polymer. Gravure cylinders traditionally are very hard and polyacetal polymers provide a hard surface. We have now surprisingly found that improved results are obtained if a softer polymeric composition is used.

A printing member according to the invention has a print surface formed of a composition comprising a blend of urethane and acetal polymers.

The blend may be a physical homogeneous blend or a chemical reaction product. Preferably it is formed by blending prepolymers under conditions such that they chemically combine. The acetal polymer component may be a homopolymer but preferably is a copolymer with a comonomer introducing ethylenic or higher alkylene groups into the polymer chain, for instance a copolymer with a cyclic ether containing an alkylene chain of at least 2 carbon atoms, for example ethylene oxide or 1,3-dioxolane. The copolymer has greater resistance to uncontrolled "unzipping" and this is more resistant to degradation by chemicals or mechanical damage than the homopolymer, but still retains the ability to be volatilised into low molecular weight volatile constituents where it is struck by a beam and to remain substantially unaffected elsewhere.

The polyacetal should have a fairly high molecular weight, for instance above 10,000 and often above 20,000, especially from the point of view of imparting adequate wear properties. For instance the molecular weight may be from 20,000 to 50,000 e.g. 40,000. A suitable material is sold under the trade name KEMATAL M25 which has a molecular weight of 40,000 and a melt flow index of about 2.5.

The proportion of urethane in the blend may be 20% to 60% preferably 35%.

The urethane may be introduced into the acetal by any blending method that results in a homogeneous blend being formed. The blending method generally involves the application of high shear in a high speed mixer.

A preferred feature of the invention is that the print surface is formed of a blend of urethane and acetal polymers that has a Notched Izod strength (pounds per inch) of at least 2.3 and preferably at least 3, with best values being above 3.5.

Preferably the elongation at break is at least 80% but is generally below 250%, values of about 130 to 200% generally being best.

The flexural modulus (pounds per square inch) is preferably below 200,000 and above 100,000, with best results being obtained at 110,000 to 150,000.

The tensile strength (pounds per square inch) is preferably below 6,300 but above 3,800, with best results being obtained at between 4,500 and 5,000. Generally the preferred physical values quoted above are obtainable when the percentage of urethane is 20 to 45% and optimum properties, for instance Notched Izod of 3.9, elongation at break of 160, flexural modulus of 130,000 and tensile strength of 4,700, may be obtainable with 35% urethane.

The print surface is preferably formed of a continuous sheet of the polymer blend, the sheet generally being supported on a substrate.

The substrate and the continuous layer may be flat but generally are cylindrical. The polymeric composition may be deposited on the substrate, which is generally cylindrical, by preforming the composition into a sheet and securing it to the substrate. When the substrate is cylindrical the sheet may be preformed as a sleeve or may be formed as a flat sheet which is converted into a sleeve, for instance by fusing or otherwise jointing the edges of the sheet. It is essential that the joint between the two edges is complete and void free along its length and that there are no measurable defects throughout the joint. Suitable apparatus for jointing the sheet is described in, for instance, our British application No. 7,931,053.

Preferably however the polymeric composition is first formulated as a powder and is then deposited on the substrate to form a continuous sheet by any convenient powder coating method. For example it may be deposited by electrostatic coating, flock spraying onto a preheated cylinder, a fluidised bed coating method or a combined electrostatic and fluidised bed coating method. During or subsequent to the deposition of the polymeric powder on the substrate the powder must be heated to fuse it into a continuous layer.

The continuous sheet must be at least 0.2 and usually at least 0.4 mm thick but it is generally unnecessary for it to be more than about 1, or at the most 1.5 mm thick. Preferably it is about 0.6 to 0.8 mm thick.

The resultant printing member can be engraved by conventional mechanical or other means but preferably is engraved by a laser beam. The print member is initially formed with a smooth print surface but upon striking the print surface with the laser beam the polymeric material throughout the entire struck area is converted to volatile products while the polymeric material in zones adjacent the struck areas remains as a rigid solid. The laser beam thus results in engraving of the print surface. The beam may be such as to give very shallow engraving, for instance 3 microns, of a depth suitable for, for instance, lithographic printing. A particular problem however arises in the production of intaglio engraved print surfaces since these have to be engraved to a much deeper depth, e.g. above 15 microns and often about 30 microns. Most polymer compositions are unsuitable for engraving by laser beam to this depth since most polymer compositions either flow from the struck areas into the engraved areas or do not volatilise completely and instead deposit polymeric composition around the rim of the engraved areas. However the blends defined for use in the invention are particularly advantageous as intaglio print members since they can easily be engraved by striking with a laser beam as described in such a way that the struck polymeric material vaporises with substantially none of it being deposited around the rim of the engraved area and with substantially none of the polymeric material in zones adjacent the struck area flowing or volatilising. Thus the print surfaces of the invention are capable of forming clear intaglio print. As explained below, some easily removable materials, such as additives in the polymeric composition, may be deposited around the rim of the engraved area but since they are easily removable (unlike the polymeric material itself) their deposition does not cause any problem.

Melting and flow from surrounding areas can be minimised, and preferably avoided, by using a blended polymeric composition having high thermal conductivity, local heat thus being dissipated, or by using a polymeric composition having very low thermal conductivity, substantially no heat being transferred from the area struck by the beam to the surrounding zone. Rigidity can also be maintained by providing fibrous reinforcement in the polymeric composition the fibrous reinforcement thus preventing flow of the polymer and holding it in the substantially rigid state even though the polymeric component of the composition may be temporarily above its softening or melting point.

In general the melt flow index of polymer blend compositions for use in the invention should be from 1 to 12, preferably 1 to 5, especially 1 to 3.

The polymeric composition preferably is a composition having a sharp melting point. The composition preferably consists of one or more polymers and optionally various fillers and reinforcements. The polymer blend preferably changes from a substantially rigid state to a molten state within a temperature range of 30° C. or less, preferably 10° C. or less, e.g. 0.2° to 5° C. Preferably the melting point is below 250° C., preferably 130° to 180° C.

Additives may be included in the polymeric composition in order to increase the absorption of the composition so that a composition which would otherwise not absorb sufficient energy to be volatilised by a particular laser beam can be volatilised by that beam. For instance the polymeric composition may consist of the polymer blend and carbon black that will have the effect of making the composition absorb the intended radiation. For instance we have found that a polymeric composition comprising a polymer blend that can easily be engraved by a carbondioxide laser may, for good engraving with a YAC laser, require the incorporation of carbon black into the polymeric material in order to increase the absorption at the wavelength of the YAC laser. Instead of using carbon black certain other organic and inorganic pigments may be used, for example based on titanium dioxide. The amount of carbon black or other pigment is generally 0.5 to 10% by weight of the polymer composition, preferably 1 to 5%.

When the layer is to be built-up by a powder coating technique it is preferred that the powdered composition includes one or more flowing agents, so as to permit a layer of adequate thickness being formed without developing pin holes or orange peel effects or worse physical defects. Suitable flowing agents include waxes, soaps and alkyl metal salts.

We find that in some instances, especially when the coating was deposited by a powder coating technique, that after engraving with consequential evaporation of the polymeric material in the engraved area there is a tendency for unwanted material to deposit around the top edge, and sometimes along the side, of the engraved area. However this material can very easily be removed and so before printing it preferably is removed by contact with organic solvent or, more preferably, a chemical etch which may be alkaline but is preferably acidic. A suitable organic solvent is methylene chloride but since the treatment can be very mild it is preferred for the methylene chloride to be present as an emulsion. Suitable acids are organic acids and inorganic acids such as phosphoric, sulphuric and chromic acid. The acids are generally concentrated. The treatment temperature is generally between 15° and 70° C. and the duration will generally be at least 30 seconds.

The treatment may be solely for the purpose of removing the flow agent or other easily removable material in which event short treatment times, e.g. up to 3 or 5 minutes and/or low temperature and/or low concentrations are preferred. Suitable removal composition comprises chromic acid, for instance in concentrations below 35%, preferably 15 to 20% optionally with a small amount of sulphuric acid, e.g. below 5% and often below 1% and optionally with a surfactant and this composition may be applied for half to 5 minutes at temperatures of 30° to 70° C. After the treatment the surface may be rinsed with water and then dried.

It is often desirable to metal plate the engraved surface and to promote adhesion of the metal plating to the plastics surface it is desirable to etch the entire surface. It may sometimes be possible to conduct this etching merely by continuation of the treatment used for removal of the flowing agent, especially if that treatment uses a concentrated mixture of chromic acid and sulphuric acid for a short duration, but preferably the engraved surface is first treated to remove the flow agent and is then treated with a stronger removal composition. Suitable removal compositions for etching the entire surface are solutions containing concentrated chromic acid and sulphuric acid, for instance containing 30 to 50% chromic acid and 15 to 30% sulphuric acid, optionally with a surfactant. Such compositions may be applied at a low temperature and/or for a short duration to remove the flowing agent only or, for overall etching, may be applied at temperatures of 40° to 70° C. for periods of 3 to 20, preferably 7 to 15 minutes.

Plating may be conducted by depositing a colloidal plladium based solution, preferably after altering the charge on the surface by subjection to a cationic surfactant solution and then conducting electrolysis deposition of copper, nickel or chromium in conventional manner. A suitable plating method is described in specification No. 1,524,717.

As an example, polyacetal was blended with a urethane polymer under high shear in a high speed mixer, and the mount of urethane being 35% by weight. The blend is converted into powder form.

A metal cylinder is heated to about 140° C. and, while earthed, a powdered composition containing this blend and containing also carbon black, flowing agent and acid anhydride curing agent but no bulk filler is sprayed onto the cylinder using an electrostatic powder spray gun. When the desired coating thickness has been obtained the cylinder and coating are heated to about 180° C. for about 30 minutes in order to fuse the coating.

The cylindrical coating is then turned so as to provide a completely smooth surface and may then be engraved, e.g. by a laser, either in spiral form or in discrete cells, in known manner. The depth of engraving is generally about 30 microns.

A mild etch composition formed of 150 to 200 g/l chromic acid, 5 ml/l sulphuric acid and 5 ml/l surfactant is formed and is contacted with the engraved surface at about 60° C. for 2 minutes. This treatment results in the removal of a very slight rim that can exist around the engraved areas.

The resultant surface can then be used directly as the print surface for intaglio printing or it may be metal plated. If it is to be metal plated it may be further etched, for instance by contact with a strong etchant composition formed from 375 g/l chromic acid, 210 ml/l sulphuric acid and 5 ml/l surfactant, at 55° C. for 10 minutes.

After each etching treatment the surface is preferably rinsed with water.

After the strong etching treatment the surface may be neutralised, subjected to charge transfer, prepared for plating by the deposition of colloidal palladium and an accelerator and then subjected to electrolysis metal deposition. The resultant print surface can be used for very long print runs.

I claim:

1. A printing member having a print surface formed of a continuous layer of a composition consisting essentially of a blend of urethane and acetal polymers.

2. A print member according to claim 1 in which the blend consists of 20 to 60% by weight urethane polymer with the balance acetal polymer.

3. A print member according to claim 1 in which the notched Izod strength of the blend is at least 2.3 pounds per inch.

4. A print member according to claim 1 in which the blend has an elongation at break of 80 to 250%, a flexural modulus of 100,000 to 200,000 pounds per square inch and a tensile strength of 3,800 to 6,300 pounds per square inch.

5. A printing member according to claim 1 wherein the print surface is formed of a composition consisting essentially of a blend which is of 20 to 45% urethane polymer and 80 to 55% acetal polymer and which has a notched Izod strength of at least 3.5 pounds per inch, an elongation at break of 130 to 200%, a flexural modulus of 110,000 to 150,000 pounds per square inch and a tensile strength of 4,500 to 5,000 pounds per square inch.

6. A printing member according to claim 1 in which the composition further contains 0.5 to 10% carbon black.

7. A printing member according to claim 1 in which the acetal polymer is a copolymer formed of recurring oxymethylene units and containing alkylene units having at least two carbon atoms.

8. A printing member according to claim 1 in which the print surface is engraved to a depth of at least 15 microns and is suitable for intaglio printing.

9. A method of making a printing member having a print surface formed of a composition consisting essentially of a blend of urethane and acetal polymer comprising depositing on a substrate a powdered composition consisting essentially of the blend of urethane and acetal polymer and heating the powdered composition to fuse it into a continous layer.

10. The method of claim 9 wherein said continuous layer is at least 15 microns thick.

11. A method of forming an engraved print surface comprising striking the print surface of a print member having a print surface which is a continuous layer of a composition consisting essentially of a blend of a urethane and acetal polymer with a laser beam in selected areas to engrave the surface by converting the composition throughout the struck areas to volatile products while the composition in adjacent areas remains as a rigid solid.

12. A method according to claim 11 in which, after the engraving, the print surface is etched by treatment with a solvent or chemical etch, thereby removing material deposited around the engraved areas.

13. A method according to claim 11 in which the engraved surface is subsequently plated with a metal.

14. A method according to claim 12 in which the engraved print surface is plated with a metal and, before plating but after engraving, the surface is chemically etched so as to improve the adhesion of the metal to the surface.

15. The method of claim 11 wherein said engraved print surface is an intaglio print surface and the engraving is to a depth of at least 15 microns.

16. The method of claim 11 in which the blend consists of 20 to 60% by weight urethane polymer with the balance acetal polymer.

17. The method of claim 11 in which the notched Izod strength of the blend is at least 2.3 pounds per inch.

18. The method of claim 11 in which the blend has an elongation at break of 80 to 250%, a flexural modulus of 100,000 to 200,000 pounds per square inch and a tensile strength of 3,800 to 6,300 pounds per square inch.

19. The method of claim 11 in which the composition further contains 0.5 to 10% carbon black.

20. The method of claim 11 in which the acetal polymer is a copolymer formed of recurring oxymethylene units and containing alkylene units having at least two carbon atoms.

21. A method of making a printing member having an engraved intaglio print surface formed of a composition consisting essentially of a blend of an urethane and acetal polymer comprising depositing on a substrate a powdered composition consisting essentially of the blend of urethane and acetal polymer and heating the powdered composition to fuse it into a continuous layer, whereafter said continuous layer is struck with a laser beam in selected areas to engrave the surface to a depth of at least 15 microns by converting the composition throughout the struck areas to volatile products while the composition in adjacent areas remains as a rigid solid.

* * * * *